Sept. 29, 1936.　　　　R. HALL　　　　2,056,101
SPEED CHANGING MECHANISM
Filed March 27, 1934　　　2 Sheets-Sheet 1
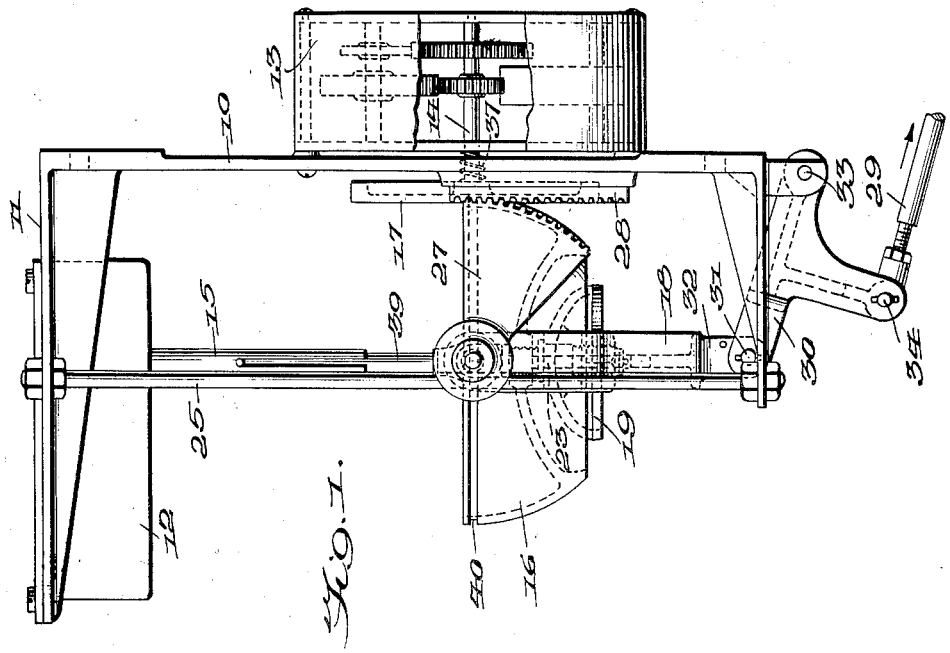
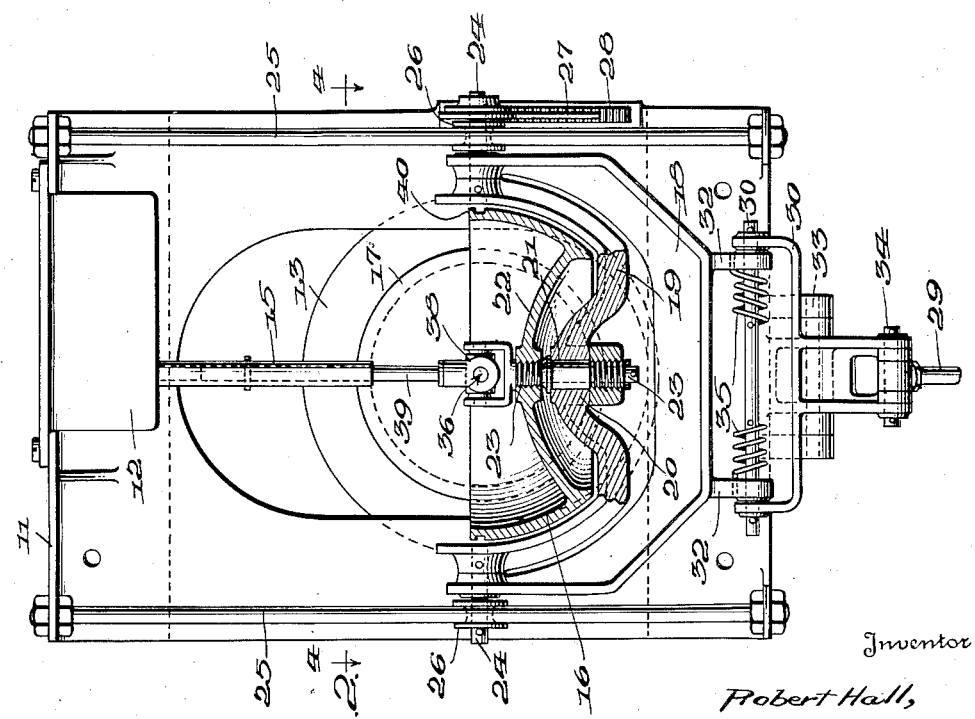
Inventor
Robert Hall,
By Edmund H. Parry Jr.
Attorney Sept. 29, 1936.  R. HALL  2,056,101
SPEED CHANGING MECHANISM
Filed March 27, 1934  2 Sheets-Sheet 2
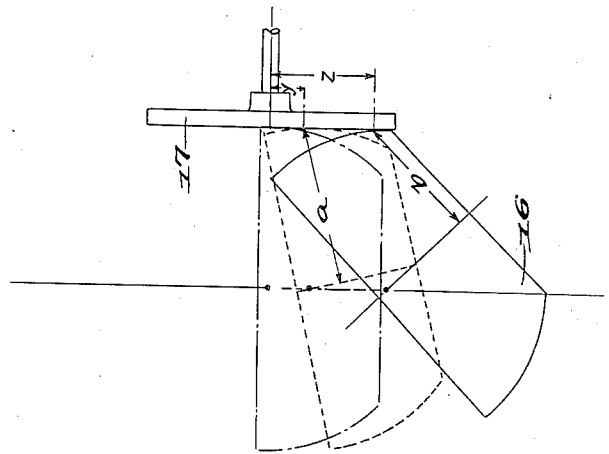
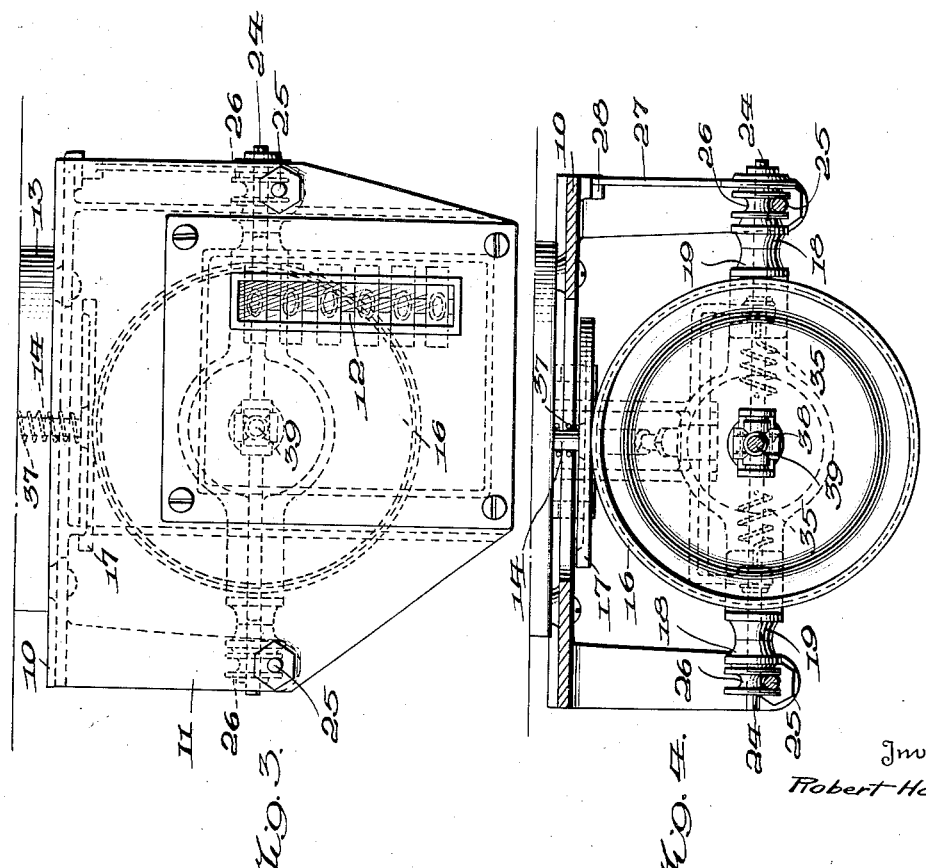
Inventor
Robert Hall,
By
Edmund N. Perry Jr.
Attorney Patented Sept. 29, 1936

2,056,101

UNITED STATES PATENT OFFICE 2,056,101

SPEED CHANGING MECHANISM

Robert Hall, Lockport, N. Y., assignor to American District Steam Company, North Tonawanda, N. Y., a corporation of New York Application March 27, 1934, Serial No. 717,686

14 Claims. (Cl. 74—198)

This invention relates to an improved form of variable speed mechanism or gearing having a variety of applications. The same is particularly useful when the installation must be relatively compact but nevertheless highly efficient. By way of example it may be stated that the invention is particularly satisfactory as a substitute for conventional types of gearing in measuring devices for determining the flow of fluid or other currents, and an embodiment of the invention adapted to such application will be particularly described.

In integrating devices for recording quantitatively the flow of steam and other currents under varying conditions, it is conventional to provide a registering or counting mechanism and to drive the latter through a constant speed motor or clock. In order that the registering mechanism operate accurately under variations in the rate of flow, it is necessary to interpose between the same and the driving motor a variable speed gearing responsive to changes in flow and serving to adjust the operating speed of the register in relation to the speed of the driving motor. While various types of gearing have been employed for this purpose, I have found that certain features of the various constructions are such as to render the various types of known gearing highly inefficient and resulting in appreciable errors in the accuracy of the registering mechanism. The particular weakness of the prior control mechanisms appears to reside in the fact that it is extremely difficult to embody the same in a form which will be sufficiently sensitive as to immediately and accurately respond to both small and large variations in the rate of flow of the current to be measured, with the result that over a period of hours, days or weeks the operating speed of the registering mechanism has not consistently been maintained in true accordance with the current conditions, and this means that the total quantity indicated by the registering mechanism may be at considerable variance with the actual total quantity passed.

According to the present invention, I employ a gearing of the spherical type especially constructed and arranged to insure constant operating engagement between the coacting parts, and including features such that the device is extremely sensitive and immediately and accurately responsive to all changes in the conditions controlling its operation. Further, and of particular importance, the proposed arrangement enables changes in speed of the gearing without any lost motion between the parts and without any interference or retardation in the rotative speeds of the driving and driven members.

In the usual type of spherical gearing it is common to depend upon the bearing contact between the spherical and coacting gears to guide and aid in the bodily adjustment and change in speed therebetween. As a characteristic feature of the present invention, it may be pointed out that the support and movement of one gear relative to the other during changes in speed is carried out so that one gear is rocked relative to the other without slippage through means which operate entirely independently of the bearing contact between the spherical gear and its coacting gear. That is to say, one gear is rocked along the surface of the other through guiding and actuating means of such character that one gear is positively shifted bodily along a longitudinal path transverse of the other and at the same time tilted on its rotational axis so as to at all times insure corresponding zones on the surfaces of the respective gears being brought into rotative engagement under actuation of the control means.

Since as above stated the variable speed mechanism is particularly suited to use in flow registering devices, the same will be described in an embodiment applicable thereto, such an arrangement being illustrated in the accompanying drawings wherein:

Fig. 1 is a side elevation of the essential parts of a steam flow integrating device with the improved variable speed gearing applied thereto;

Fig. 2 is a view of the same device taken at right angles to Figure 1 and showing certain parts of the variable speed gearing in section;

Fig. 3 is a top plan view corresponding to Figure 2;

Fig. 4 is a view in horizontal section taken approximately on the line 4—4 of Figure 2; and Fig. 5 is a diagrammatic view of the essential portions of my variable speed gearing and illustrating the operation thereof.

In the drawings the reference numeral 10 designates generally a supporting frame which includes an end plate 11 to which is secured an exhibitor, diagrammatically shown and indicated at 12, the same comprising a registering or counting mechanism as will be clear from Figure 3. To operate the registering mechanism an electrical or mechanical motor or clock work 13 is provided, the same operating a power or driving shaft 14 which preferably extends perpendicularly, or substantially so, to a driven shaft 15 operatively connecting with the registering mechanism. The motor 13 may, as shown in Figure 1, be supported on the side member of the frame 10, but of course the same may be independently supported if so desired.

The essential parts of my variable speed mechanism as applied in the association just described comprise two coacting rotary gears in tangential point rolling engagement with each other. One of such gears will have a tapered, arcuate or convex periphery constituting a segment of a sphere-like body. Particular advantages are gained when such gear takes the form of a hemisphere as shown and designated at 16 in the drawings. Such gear may be of metal or other material, but preferably should have a slightly roughened surface to insure efficient frictional driving engagement with the coacting gear.

In driving engagement with the spherical or spheroidal segment 16 is a coacting revoluble body. Preferably, and where the drive and driven shafts 14 and 15 extend substantially perpendicularly to each other, the revoluble body will take the form of a disc 17 of metal or other material having a face in frictional driving engagement with the surface of the gear 16. Either of the two gears 16 and 17 may be employed as the driving gear to actuate the other, but as a matter of convenience and as shown in the illustrated embodiment I employ the spheroidal segment 16 as the driven gear in connection with the exhibitor shaft 15 and the disc gear 17 as the driving gear operating from the power shaft 14.

To obtain a variation in the relative speeds of the gears 16 and 17 responsive to control mechanism, it is proposed to arrange the gears 16 and 17 in such manner and to provide suitable mechanism which will positively insure the rocking of the coacting surfaces of the two gears, one relative to the other. By such rocking action the effective radius of the spherical gear 16 will be altered without any slippage between the coacting surfaces, and where the same coacts with the face of a rotatable disc such as 17 the effective radius of the latter will also be simultaneously adjusted.

The rocking action between the two gears may be carried out most expeditiously and with a relatively simple structural arrangement by rocking the spherical gear 16 with respect to the other gear. To this end the gear 16 must be supported so that it may tilt on its axis of rotation and at the same time, in order to avoid slippage, the same must shift bodily along a path transverse of the coacting surface of the gear 17. These two types of movement are to be carried out simultaneously, each through positively operating mechanism as will become evident from the further detailed description.

Positioned opposite the gear 17 is a supporting member or yoke 18, best shown in Figure 2, the same being mounted for movement in a direction transverse of the surface of the disc 17 in a manner shortly to be described. Such member may be said to be the primary support for the spherical gear 16, but in order to permit gear 16 to tilt in a plane perpendicular to the coacting surface of the disc at the point of contact, the gear 16 must be movable independently of the supporting member 18. A second supporting member in the form of the yoke 19 is provided, the same including a seat portion 20 with a bushing 21 extending therethrough. As will be noted from Figure 2 the gear 16 is hollow and provided with an interior web or spider 22 which receives and is fixed to a stub shaft 23 which coincides with the rotational axis of the gear. Such stub shaft extends through and is freely rotatable in the bushing 21, enabling the spherical gear to rotate.

The yoke 19, as will be seen from a comparison of Figures 1 and 2, is positioned so that its arms coincide with corresponding arms of the main supporting yoke 18. Corresponding pivot shafts 24 extend through the respective arms of the yoke 18 and the arms of the yoke 19 so as to pivotally support yoke 19 with respect to the yoke 18 and permit the same, together with the spherical gear, to enjoy a tilting or swinging movement independent of the yoke 18. The complementary pivot shafts 24 thus define a tilting axis for the spherical gear 16, and in order that the tilting movement may be in a plane perpendicular to the coacting surface of the disc gear 17 the spherical yoke members are positioned in the supporting frame 10 so that such axis extends transversely and parallel to the surface of the disc.

As previously mentioned, the supporting yoke 18 is movable along a path opposite the coacting surface of the disc. This may be accomplished by providing a pair of guide rods 25 extending in a direction longitudinally of the surface of the disc and bolted at their ends to suitable portions of the frame 10. The yoke 18 engages and is guided by said rods along a longitudinal path through grooved pulley wheels 26 which may be conveniently supported on the yoke pivot shafts 24. The guide rods are spaced from the surface of the disc 17 a distance such that as the yoke 18 shifts longitudinally along the rods the surface of the gear 16 will be maintained in frictional driving engagement with the coacting surface of the disc gear 17, the guide pulleys 26 then riding on the disc side of the rods 25 so as to prevent the spherical gear 16 from becoming disengaged from the gear 17.

Of course, in order that the spherical gear may be always rotatable with respect to the gear 17 when the supporting yoke 18 is at any position of its longitudinal path, the arrangement of the yokes 18 and 19 must be such that the axis of rotation of the spherical gear 18, as represented by the supporting stub shaft 23, must be in alignment with the rotational axis of the disc gear 17 and extend diametrically thereof. That is to say, the movement of the yoke 18 along its longitudinal path must be such as to move the spherical gear 16 along a radius of the gear 17 whereas in the present embodiment the gear 17 is in the form of a flat disc.

As previously explained the tilting axis, which enables the spherical gear with the supporting yoke 19 to swing relative to the yoke 18 to and away from the coacting surface of the gear 17, extends transverse of said gear. Since such tilting axis is carried by the movable yoke 18 it will be shifted longitudinally of the surface of the disc 17 as the supporting yoke 18 moves along its transverse path. To effect a positive tilting movement of the spherical gear, a toothed gear segment 27 having the same pitch diameter and a curvature corresponding to the contour of the gear 16 is fixed to the yoke 19 which immediately supports the spherical gear. As best shown in Figures 1 and 2, this may be conveniently accomplished by securing the toothed segment to the pivot shafts 24 which define the tilting axis of the spherical gear and at the same time securing the arms of the yoke 19 to such shafts. Coacting with the toothed segment is a rack 28 supported on the frame 10. With such an arrangement, as the main supporting yoke 18 is moved along its longitudinal path the gear segment 27 will be actuated by the rack to swing the yoke 19 and the spherical gear 16 in a direction perpendicular to the surface of the gear 17.

To move the yoke 18 along its longitudinal path and therethrough bodily shift the gear 16 along the surface of the gear 17 simultaneously as the gear 16 is tilted with respect to the gear 17 through the mechanism just described, an actuating arm 29 is provided. Since the main yoke 18 is supported only by the guide rods its lower end is capable of independent movement. It is hence possible to pivotally connect the same to a bell crank yoke 30 through a shaft 31, wings or lugs 32 being provided at the end of the yoke 18 for this purpose. The bell crank yoke 30 may be pivotally supported on the main frame at 33. The actuating arm 29 will be pivotally connected to one arm of the bell crank at 34. With such an arrangement, movement of the arm 29 will shift the yoke 18 along the guide rods to accomplish the bodily shift of the spherical gear previously described. It is desirable to provide suitable means to prevent wobbling and undesired movement of the yoke 18 as the spherical gear 16 is in rotative driving engagement with the other gear, and at the same time to provide for the return of the spherical gear to its original position after the same has been shifted by the actuating arm. These results may be brought about by providing springs 35, secured at one end to the shaft 31 between the main supporting yoke 18 and the bell crank yoke 30, and bearing at their other ends against the sides of the lug portions 32 of the yoke 18. It will be evident that the actuating arm 29 constitutes the main control for the speed changing mechanism. Assuming that the same is operative by movement in the direction of the arrow in Figure 1, and through the bell crank arm serves to move the yoke 18 in a downward direction with respect to the position of the device shown in the drawing, it will be understood that the springs 35 tend to move the yoke 18 in the opposite direction or upwardly.

The gear 16 in the embodiment shown in the drawings is in the shape of a hemisphere or, more properly, a hemispherical segment. It therefore has a center of curvature lying on its rotational axis from which every point on its surface is equidistant. In order to maintain the gear in constant engagement with the coacting surface of the gear 17 as the same is rocked under longitudinal movement through the yoke 18 and tilting movement through the toothed segment 27, the tilting axis as represented by the pivot shafts 24 should be positioned at a longitudinal position with respect to the rotational axis so as to pass through the center of curvature (indicated at 36 in Figure 2). With the sphere thus tilting around its center of curvature the path of movement of the main supporting yoke 18 will be in a plane parallel to the coacting surface of the gear 17, and maintain contact between the surfaces of the several gears under both tilting and shifting movement of the hemispherical segment gear.

It should be understood, however, that the more essential improvements of the present invention reside in the provision of the positive means for simultaneously shifting the gear 16 transverse of the gear 17 and tilting the same to get the proper rocking movement without slippage between the surfaces of the gears or interference with their rotative driving engagement. It is within the contemplation of the invention to shape the gear 16 with an operative peripheral surface other than the segment of a true sphere. The main requirement of the gear 16 is that it should have a tapered arcuate surface of appreciable width. Thus, the gear may take the form of any spheroidal (such term being used in a generic sense) segment such as a conoid. While spheroidal bodies other than a true sphere have no center point from which all parts of its surface are equidistant, it will be obvious that the tilting axis may be taken at a desired point longitudinally of the rotational axis of the gear 16 and the guide rods 25 so shaped and directed with respect to the surface of the coacting gear 17 as to move the main supporting yoke 18 along a path such that the distance between the tilting axis of the gear 16 and the surface of the gear 17 will be varied in conformity with the variation in distance between the tilting axis and the various portions of the spheroidal gear surface. That is to say, the guide rods will be arranged in any case so that the distance between the tilting axis of the gear 16 and the coacting gear 17 will be the same as the distance between the tilting axis and the surface of the gear 16, when, through the cooperative action of the shifting and tilting mechanism, various points on the surface of the gear are brought into position for engagement with the surface of the gear 17. As in the case of the hemispherical gear, the tilting movement will coincide with the shifting movement by shaping the toothed segment so as to correspond in curvature with the spheroidal curvature of the gear 16.

Referring again to the illustrated embodiment of the invention wherein the spheroidal gear constitutes a hemispherical segment, it will be understood that the rocking movement attained by the cooperative action of the shifting and tilting mechanisms serves to vary the effective radius of the hemispherical segment, and, further, where as shown the rotatable gear 17 comprises a flat disc, the effective radius of the latter gear will also be simultaneously changed. Considering in this connection the diagrammatic view of Figure 5, it will be seen that as the gear is bodily shifted and tilted from its initial position, the effective radius of the gear 16 will progressively decrease from a maximum to a minimum. Thus, in the figure in the successive positions illustrated the effective radius will decrease to the distance $a$ and to the shorter distance $b$ as measured from the axis of rotation of the hemispherical segment perpendicularly to the surface thereof. At the same time, as the effective radius of the hemispherical segment decreases, the effective radius of the disc 17 will undergo a corresponding change. If the initial position of the segment relative to the disc is with the end of smaller diameter towards the periphery of the disc and the larger end of the segment nearest the disc axis, the effective radius of the disc will be progressively increased from a minimum to a maximum as the effective radius of the segment decreases for a maximum to a minimum. Thus, it will be noted in the figure that in the successive positions shown the effective radius of the disc 17 will be represented by the distance $y$ when the radius of the segment is represented by $a$, and will increase to $z$ when the radius of the segment has decreased to the distance $b$.

Which of the two gears is to constitute the driving gear is open to choice. In the embodiment illustrated the disc gear 17 is shown as the driving gear, the same being fixed to the drive shaft 14 and powered by the motor 13. In order to prevent any undesired axial movement of the drive shaft such as might interfere with the frictional engagement between the coacting gears, it may be advisable to position a spring 37 behind the disc 17 to cause the same to constantly press against the surface of the gear 16.

Since in the arrangement under consideration the spheroidal gear 16 is to constitute the driven gear of the pair, the same will be operatively connected to the shaft 15, which as previously described extends substantially at right angles to the drive shaft 14. To permit the rocking movement of the spherical gear in the manner described, it will be evident that the same must not be rigidly secured to the shaft 15, but arrangement may be made so that the rotational axis of the gear defined by the stub shaft 23 may during rotation tilt with respect to the axis of the shaft 15, and it is further necessary that the shaft 15 must be adjustable with respect to the length thereof in order to allow the gear to be shifted longitudinally with respect to the shaft under movement of the yoke 18 along its path. The tilting of the gear can readily be taken care of by providing a flexible driving connection between the axially rotatable stub shaft 23 of the spheroidal gear and the drive shaft. Such connection may conveniently take the form of a universal joint best shown in Figure 2 and generally designated by the numeral 38. A simple expedient to compensate for the longitudinal shift of the gear is to provide the driven shaft 15 with a telescoping portion 39 slidable in a hollow main portion and rotatable therewith through a splined or pin and slot connection. One portion of the adjustable length shaft will rotatably connect with the exhibitor 12 and the end of the other portion be coupled to universal joint 38. The universal joint should, of course, lie in a common plane with the pivot shafts 24 and be located at the point of intersection of the rotational axis 23 with the axis defined by said shafts. That is to say, where the shaft 15 is rigid, its flexible connection with the gear must be coincident with the tilting axis about which the gear swings during rocking movement.

Considering the combination arrangement of the power and registering mechanisms and the variable speed mechanism as a whole, and assuming by way of example that the device is used as a steam flow integrator, the actuating arm 29 will be operated by suitable mechanism responsive to variations in flow of the steam and its movement will cause the spheroidal gear 16 to be positively rocked back and forth radially of the gear 17. The resulting variation in the gear ratio of the gears 16 and 17 will result in corresponding changes in the speed of the driven shaft 15 which operates the registering mechanism 12 relative to the speed of the shaft 14 powered by the constant speed motor 13. When the actuating arm 29 is moved in the direction indicated by the arrow in Figure 1, the spheroidal gear 16 will be rocked away from the position indicated to increase the effective radius of the disc 17 and decrease the effective radius of the spheroidal gear so as to cause the speed of the shaft 15 to increase relative to the power shaft 14. This, of course, will occur where the rate of flow increases so that a larger quantity must be rung up by the registering mechanism during a given period. If the rate of flow decreases, the spheroidal gear will be rocked back in the opposite direction to slow down the speed of the driven shaft 15 and thus slow down the operation of the registering mechanism.

When the flow of fluid ceases, the registering mechanism must stop functioning. This may be accomplished as shown in the drawings by arranging the spheroidal gear to occupy at one end of its path a neutral, or zero, position at the axial center of the disc and providing a peripheral groove 40 in the gear such as to cause the same to contact the disc simultaneously at two points on opposite sides of the disc axis. This will prevent the gear from rotating and result in slippage between the coacting gear surfaces even though the motor still operates to revolve the disc, and hence render the registering mechanism inactive until the flow of fluid, operating through the actuating mechanism, shifts the spheroidal gear out of its zero point into a position of rolling contact with the disc.

The actuating mechanism for simultaneously and positively effecting the shifting of the spheroidal gear and the tilting thereof may, of course, be changed in construction from the specific set up of parts in the illustrative embodiment of the drawings, and as previously indicated, by proper selection of the path along which one gear is shifted relative to the surface of the other in a manner which will be evident to those skilled in the art, the position of the tilting axis of the rocking gear and the shapes of the several coacting gears can be varied, all without departing from the scope of the invention as indicated by the appended claims.

I claim:

1. Speed changing mechanism for measuring devices including a power shaft, a driving disc on the power shaft, a gear having an operating surface lying on a sphere rotatable about its axis making frictional point rolling engagement with the surface of the disc and being driven thereby, a support for said gear permitting the same to shift along a path transverse of the coacting surface of the disc and also to tilt about a transverse axis passing through the center of curvature of its surface, speed control means operative to simultaneously shift and tilt the spherical gear, a driven shaft adjustable in length to compensate for shifting of the spherical gear operatively connecting with the spherical gear, and a flexible driving connection between the spherical gear and said shaft located at the center of curvature of the spherical gear and permitting the same to tilt independently of said shaft.

2. In a speed changing device, a rotatable driven shaft, a constant speed power shaft extending substantially perpendicularly to said driven shaft, a driving disc secured to the end of the power shaft, a rotary spherical segment gear having its rotational axis in general alignment with the driven shaft and making frictional driving engagement with the face of the disc, said spherical gear being shiftable in the direction of its rotational axis transversely across the face of the disc and also being tiltable about a transverse axis which passes through the center of curvature of its surface, a universal joint at the rotational axis of the gear at the point where such axis meets the transverse tilting axis enabling the spherical gear to tilt relative to the driven shaft and providing a driving connection between the gear and said driven shaft, length-compensating means associated with said driven shaft permitting the spherical gear to shift longitudinally, and control means operating to rock the spherical gear across the face of the driving disc comprising means producing a positive shift of the spherical gear longitudinally and simultaneously causing the same to tilt on its transverse axis.

3. In a variable speed gearing, the combination of a revoluble gear rotatable about a stationary axis, a spheroidal segment gear rotatable about its own axis and in constant driving engagement with said revoluble gear, a tiltable supporting member carrying the spheroidal gear and movable in a path transverse to the revoluble gear surface to rock said gear along its arcuate surface without slippage across the surface of the revoluble gear to move the point of driving engagement, means operating through the supporting member to positively shift the spheroidal gear along its path, and means positively operating under movement along said path to tilt the supporting member to incline the rotational axis of the spheroidal gear and rock its surface along the other revoluble gear to simultaneously and without slippage change the point of driving engagement relative to the surface of both gears.

4. In combination, a spherical segment gear rotatable about its axis, a coacting rotary gear having a side face making frictional rolling point contact with the segment gear, said coacting gear being supported for rotation about an axis lying in a plane passing through the rotational axis of the spherical segment, a pivotal support to which the spherical segment is secured permitting the spherical segment to tilt on its rotational axis about its center of surface curvature towards the coacting surface of the other gear, said pivotal support being movable along a path in a direction radial to the coacting gear to rock the spherical gear across the surface of said coacting gear, and speed changing mechanism for said gearing adapted to rock the spherical gear across the coacting gear and comprising means operative to positively shift the pivotal support of the spherical segment along its transverse path and simultaneously to tilt the spherical gear on its pivot.

5. In combination with a drive shaft and a driven shaft, speed changing mechanism interposed therebetween including a disc gear rotatable with and connected to one of said shafts, a circular gear rotatable with and connected to the second of said shafts, said circular gear having a tapered arcuate peripheral surface of appreciable width making rolling point contact with and frictionally engaging the face of the disc, a flexible connection between one of the gears and its connecting shaft permitting the gear to tilt during rotation, a mounting for said tiltable gear supporting the same independently of its connecting shaft, said mounting being pivoted for swinging movement about an axis transverse to the connecting shaft of the tiltable gear, speed control means operative through the swinging mounting to tilt the gear supported by the mounting relative to the surface of the coacting gear, the swinging mounting carrying the gear and its tilting axis being movable along a path extending radially of the disc in such manner that as the gear is tilted under actuation of the control means it will rock without friction across the surface of the coacting gear to vary the ratio between the gears and change the relative speeds of the drive and driven shafts.

6. Variable speed gearing, comprising a drive shaft and a driven shaft, a rotary gear having a tapering arcuate peripheral surface, a drive coupling directly connecting the rotary gear to one of the shafts permitting the gear to rock on its axis relative to said shaft, a coacting rotary gear on the other shaft having an extended surface making point driving engagement with the arcuate periphery of the first gear, a mounting movable in a fixed path relative to said coacting gear, the tapered gear being movable with said mounting and supported thereby to tilt and rock along its arcuate surface without slippage across the surface of the coacting gear under movement of the mounting, and control means for shifting said mounting on its path and operable through the mounting to rock the arcuate surface of the tapered gear across the surface of the coacting gear.

7. Variable speed gearing, comprising a drive shaft and a driven shaft, a rotary gear having a tapering arcuate peripheral surface, a stub axle supporting said gear for rotation about its axis, a flexible drive coupling connecting said stub axle to one of said shafts permitting the gear to rock on its stub axle relative to said connecting shaft, a coacting rotary gear on the other shaft having an extended surface making point driving engagement with the arcuate periphery of the first gear, a mounting movable in a fixed path relative to said coacting gear, the tapered gear being movable with said mounting and supported thereby to tilt and rock along its arcuate surface without slippage across the surface of the coacting gear under movement of the mounting, and control means for shifting said mounting on its path and operable through the mounting to rock the arcuate surface of the tapered gear across the surface of the coacting gear.

8. In combination with a drive shaft and a driven shaft, speed changing mechanism therebetween including a disc fixed to the end of one of said shafts, a circular gear having a tapered arcuate peripheral surface making rolling point contact with and frictionally engaging the face of the disc, a flexible driving connection between the gear and the second shaft such that the gear during rotation may tilt relative to the face of the disc, a mounting supporting the gear for rotation on its axis and itself being pivotal about an axis transverse both to the axis of the gear and to the face of the disc, actuating means operatively connecting with the mounting and adapted to shift the mounting and its gear in a direction transverse of the disc, a stationary rack, a sector gear having a curvature corresponding to the arcuate periphery of the circular gear and positioned opposite said circular gear and connecting thereto through the pivot of the gear mounting, said sector gear engaging the rack to rock the circular gear and shift the point of rolling contact of its surface on the disc face as the gear is shifted longitudinally, thereby to vary the ratio between the circular gear and disc and change the relative speeds of the drive and driven shafts.

9. Speed changing mechanism including a circular gear having a tapered arcuate peripheral surface, a yoke carrying said gear and supporting the gear for rotation about an axis extending centrally between the opposing yoke arms, a supporting member for said yoke capable of shifting generally longitudinally of the axis of the gear, a pivotal connection between the supporting member and the arms of the yoke permitting the yoke and gear to tilt with respect to the supporting member about an axis transverse to the rotational axis of the gear, a sector gear having a curvature corresponding to the arcuate periphery of the tapered gear pivotal about said transverse axis and fixed to the yoke, a rack coactive with the sector gear and operative as the yoke supporting member is moved longitudinally to rock the yoke and the tapered arcuate gear, a further rotary gear in frictional rolling point engagement with the tapered arcuate peripheral surface of the rockable gear, means to vary the gear ratio between said frictionally engaging gears comprising a control member adapted to shift the longitudinally movable yoke-supporting member and therethrough in cooperation with the sector gear to rock the tapered arcuate gear transversely across the surface of the rotary gear and change the point of rolling contact therebetween, and means to maintain the gears in frictional engagement.

10. Speed changing mechanism including a circular gear having a tapered arcuate peripheral surface, a yoke carrying said gear and supporting the gear for rotation about an axis extending centrally between the opposing yoke arms, a supporting member for said yoke capable of shifting generally longitudinally of the axis of the gear, a pivotal connection between the supporting member and the arms of the yoke permitting the yoke and gear to tilt with respect to the supporting member about an axis transverse to the rotational axis of the gear, a sector gear having a curvature corresponding to the arcuate periphery of the tapered gear pivotal about said transverse axis and fixed to the yoke, a rack coactive with the sector gear and operative as the yoke supporting member is moved longitudinally to rock the yoke and the tapered arcuate gear, a further rotary gear in frictional rolling point engagement with the tapered arcuate peripheral surface of the rockable gear, means to vary the gear ratio between said frictionally engaging gears comprising a control member adapted to shift the longitudinally movable yoke-supporting member and therethrough in cooperation with the sector gear to rock the tapered arcuate gear transversely across the surface of the rotary gear and change the point of rolling contact therebetween, and guide rods for said longitudinally movable yoke-supporting member.

11. Variable speed gearing, comprising a rotary gear having a side face, and a gear having a convex surface in driving contact with the rotary gear side face, a mounting supporting the convex gear for rotation on its axis, a frame supporting said mounting independently of the bearing contact between said coacting gears, said mounting being movable radially of the rotary gear in a fixed path transverse to the side face of the rotary gear, means supporting the mounting in the frame for tilting movement, and means operating through the mounting for causing its tilting movement simultaneously with its movement along said path to rock the convex gear without slippage across the rotary gear and thereby vary the gear ratio.

12. Variable speed gearing comprising a rotary gear having a side face and a gear having a convex surface in driving contact with the rotary gear side face, a tiltable mounting to which the convex gear is secured for rotation on its axis, movable supporting means carrying the tiltable mounting, guide means extending in a direction radial to said rotary gear along which said mounting is shiftable relative to the rotary gear in a path transverse to the rotary gear operating side face, and gear ratio adjusting means operable to effect a relative shift of said tiltable mounting along its guides and simultaneously to tilt said mounting on its guides, thereby to move said mounting relative to the rotary gear and rock the convex gear supported by the mounting transversely across the coacting surface of the rotary gear.

13. In a changeable speed mechanism, a rotary gear having a tapered arcuate peripheral surface and a coacting rotary gear having a radial face making frictional driving engagement therewith, a mounting tiltable about a pivot and secured to said arcuate gear which is bodily shiftable along a fixed path radial to the other gear to shift the point of engagement along the surface of the latter gear, the arcuate gear being pivotally supported by its mounting and freely movable about the pivot of the mounting so as to rock without slippage across the surface of the other gear as its mounting moves along its path, and operating means for moving the mounting along its path and simultaneously tilting the arcuate gear on its pivot in the same direction to rock said arcuate gear across the surface of the other gear.

14. In a changeable speed mechanism, a driving disc, a driven member, a spherical gear rotatable about its axis and making rolling point driving engagement with said disc, means for rocking the spherical gear across the surface of the disc to move the point of driving engagement simultaneously in the same direction along the surfaces of both the gear and the disc, thereby to change the gear ratio therebetween, and a flexible driving connection between the driven member and the spherical gear at its rotational axis permitting rocking movement of the gear relative to the driven member.

ROBERT HALL.